May 10, 1966 C. D. KLEM ET AL 3,251,013
CONTROL STICK TRANSDUCER
Filed June 10, 1963 2 Sheets-Sheet 1

INVENTORS
CHARLES D. KLEM
BUDDY F. LANE
BY
ATTORNEY

United States Patent Office 3,251,013
Patented May 10, 1966

3,251,013
CONTROL STICK TRANSDUCER
Charles D. Klem and Buddy F. Lane, Phoenix, Ariz., assignors to Sperry Rand Corporation, Sperry Gyroscope Company Division, Great Neck, N.Y., a corporation of Delaware
Filed June 10, 1963, Ser. No. 286,780
3 Claims. (Cl. 336—30)

The present invention relates to control stick transducers used in conjunction with automatic pilot systems for dirigible aircraft.

The control stick transducer of the present invention is an improvement over that shown in U.S. Patent No. 2,408,770 issued October 8, 1946, to C. A. Frische et al., entitled, "Electro-Hydraulic Control System," and assigned to the same assignee as the present invention.

The control stick transducer of the present invention is an eletctro-mechanical device capable of converting the manual effort of the human pilot into signals that may be used as information for the control of an automatic flight control system. With respect to the roll axis, for example, as the pilot applies a force to rotate the control wheel, the control stick transducer of the present invention which is connected to the control wheel provides an electrical signal having an amplitude and phase representative of the magnitude and direction of the force applied by the human pilot.

Prior art control stick transducers require either an excessively large displacement of the control wheel to provide a satisfactory signal, have unduly high frictional characteristics, exhibit relatively high hysteresis effects with respect to the torsion member or the pick-off characteristics are such that they are relatively unstable around the null position of the pick-off. Furthermore, prior art devices are relatively complex and expensive to manufacture. Another serious disadvantage of the prior art devices concerns their sensitivity to vibration and acceleration effects causing them to produce an erroneous output signal when subjected to these effects.

Therefore, it is an object of the present invention to provide a control stick transducer which provides output signals accurately representative of the manual force applied thereto.

It is another object of the present invention to provide a control stick transducer which has a very low hysteresis characteristic and a high null stability.

It is an additional object of the present invention to provide a control stick transducer that is rugged, simple in operation, and relatively inexpensive to manufacture.

Other objects and advantages of the present invention will become apparent from the following specification and drawings wherein:

FIG. 3 is a cross-sectional view of FIG. 1 taken along the lines 3—3.

Figure 1:
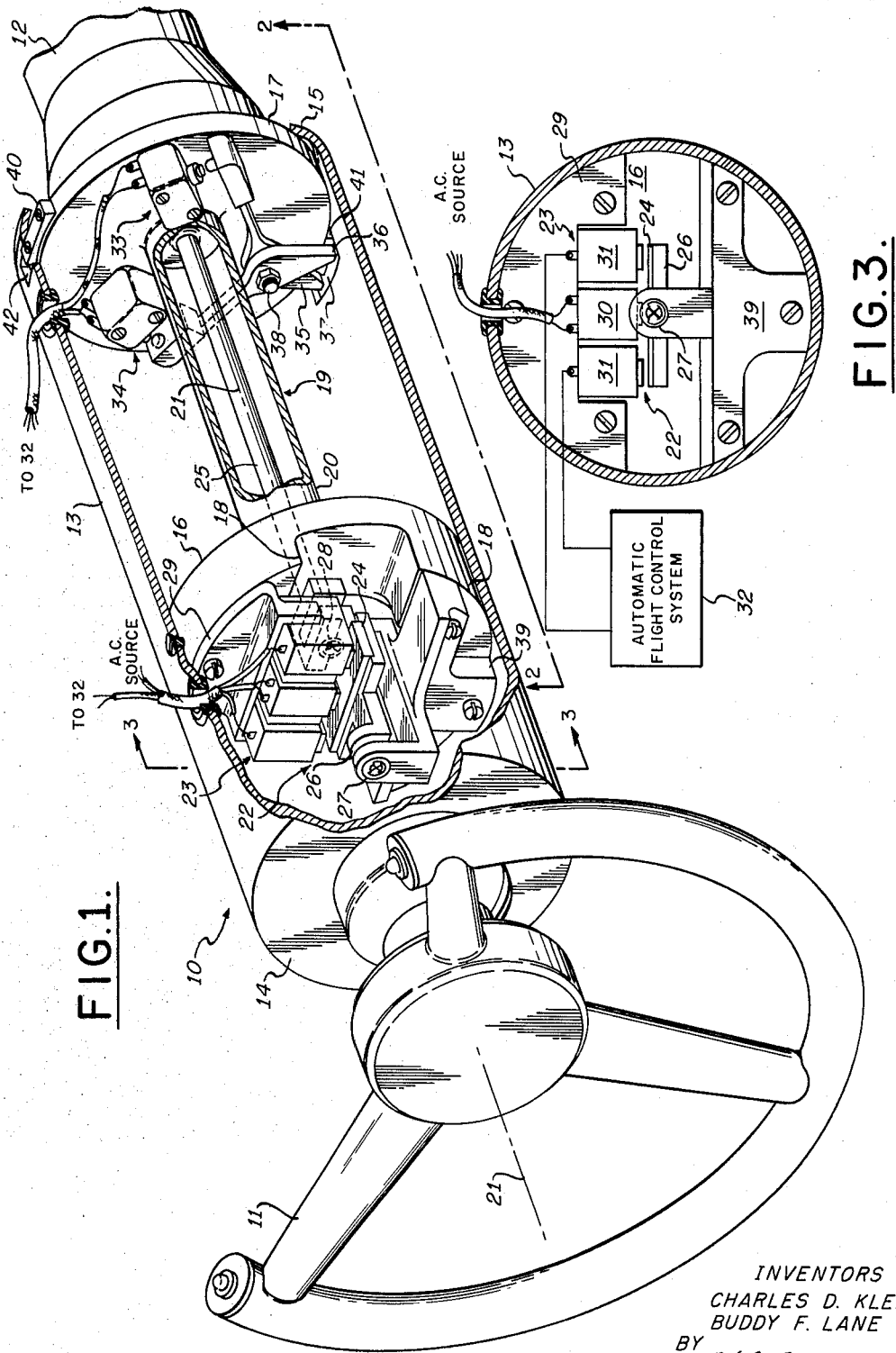
FIG. 1 is a perspective view partly in section of the control stick transducer of the present invention.

Referring to the drawings, the control stick transducer 10 of the present invention is connected in line between a control wheel 11 and the aircraft roll axis control linkage which for purposes of simplicity will be described as a control stick or column 12. The construction and operation of the aircraft control stick 12 is conventional and will be explained for purposes of describing the present invention with respect to providing control of the aircraft in roll only. The control stick transducer 10 includes a hollow cylindrical housing 13 having an extremity 14 which may be connected directly, or indirectly, by means of a splined or other mechanical connection to the control wheel 11 and a cantilevered extremity 15 which is normally free to move in a manner to be explained.

Figure 2:
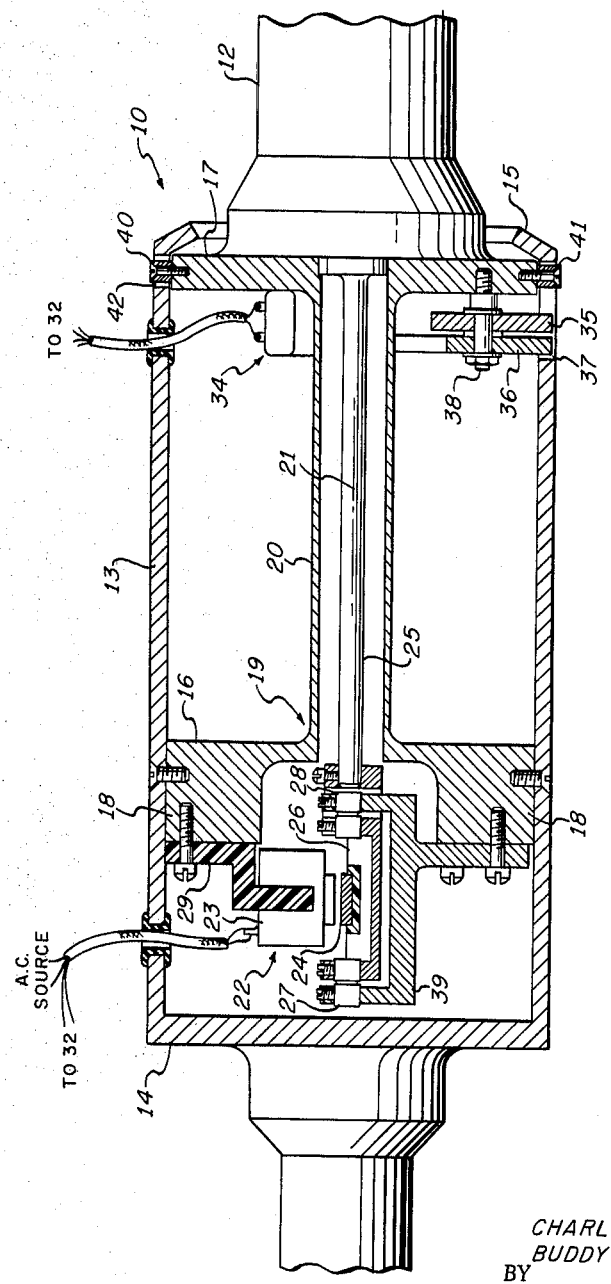
FIG. 2 is a sectional view of the control stick transducer of FIG. 1 taken along the lines 2—2.

As shown more clearly in FIG. 2, spool shaped torsion means 19 includes a hollow resilient torsion tube 20 connected between first and second spaced support flanges or members 16 and 17. The flanges 16 and 17 may be circular plates which form the extremities of the torsion means 19. The torsion tube 20 and the flanges 16 and 17 are machined from a single piece to form an integral unit 19 for reasons to be explained. The flange 16 is secured to the housing 13 near its extremity 14 by screws or other suitable means while the flange 17 is connected to the control linkage or column 12 by means of a spline or other mechanical connection in such a manner that torque applied to the control wheel 11 is transmitted through the housing 13 to the torsion tube 20 at the first flange 16, and thence through the torsion tube 20 to the control linkage 12 by means of the second flange 17. The flanges 16 and 17 of the torsion means 19 are circular in shape and fit within the cylindrical housing 13. Preferably, the longitudinal axes of the torsion tube 20 and the housing 13 are coincident and the centers of the flanges 16 and 17 of the torsion means 19 lie along the axis 21 defined thereby. The diameter of the flange 17 is slightly less than the internal diameter of the housing 13 in order that the lower extremity 15 of the housing 13 does not normally come in contact with the flange 17.

To provide an electrical signal representative of the torque applied to the control wheel 11 around the axis 21, an E-transformer type pick-off 22 has its stator 23 mounted on an extension 18 of the flange 16 by means of a non-magnetic mounting plate 29 while its armature 24 is effectively mounted on one extremity of a rigid shaft 25 that is coaxially disposed within the hollow torsion tube 20. The shaft 25 has its longitudinal axis coincident with the axis 21 and has its other extremity secured to the flange 17 of the torsion means 19. The armature 24 is actually mounted on an armature support element 26 that is connected to the shaft 25. The armature support element 26 is mounted within a support bracket 39 that in turn is secured to the extension 18 of the flange 16. Two spaced flexural pivots 27 and 28 interconnect the armature support element 26 and the support bracket 39 to stabilize the armature 24 while permitting limited relative rotation of the flange 16 and thus the stator 23 of the pick-off 22 with respect to the armature 24 around the axis 21. The cross-band flexural pivots 27 and 28 permit limited relative movement of the stator 23 with respect to the armature 24 without introducing undesirable friction effects.

As shown more clearly in FIG. 3, the E pick-off 22 is provided with an excitation winding 30 connected to a suitable alternating excitation source indicated by the legend while its output windings 31 are connected to an automatic flight control system 32.

Snap action type contact switches 33 and 34 are mounted on the flange 17 of the torsion tube 20. Scissors type actuator arms 35 and 36 are pivotally mounted on the flange 17 by means of a pivot stud 38. The arms 35 and 36 protrude through an opening 37 in the housing 13 in order that when the housing 13 has rotated through a predetermined angle, with respect to the flange 17, one or the other of the contact arms 35 and 36 will abut against the housing 13 thereby pivoting its switch arm about the stud 38 and closing the switch associated therewith to provide a signal to the automatic flight control system 32 for mode control or other purposes.

Spaced stop members 40 and 41 are mounted on the periphery of the flange 17 and protrude through diametrically opposed openings 37 and 42 respectively in the housing 13 in order to provide a mechanical connection between the control wheel 11, the housing 13, the stop members 40 and 41 and the control linkage 12 when the limit defined by the distance between the housing 13 and the stop members 40 and 41 exceeds a predetermined amount in a manner to be explained.

In operation, as the pilot applies a torque to the control wheel 11 around the axis 21 in order to cause the aircraft to roll, the torque is transmitted through the housing 13. This torque is applied through the flange 16 in the same direction thereby twisting the torsoin tube 20 which has its other flange 17 fixed with respect to the control linkage 12. The torsion tube 20 is twisted in a direction depending upon the direction of the applied torque and by an amount proportional to the magnitude of the torque applied around the axis 21. The stator 23 of the E pick-off 22 rotates with the flange 16 around the axis 21 while the armature 24 of the E pick-off 22 remains stationary since it is secured to the shaft 25 which is fixed to the stationary flange 17 of the torsion means 19. Therefore, the relative displacement of the stator 23 of the E pick-off 22 with respect to its stationary armature 24 provides an electrical signal to the automatic flight control system 32 having an amplitude and phase representative of the magnitude and direction of the torque applied to the control wheel 11 around the axis 21.

Thus, the present invention utilizes a torsion tube 20 to produce a displacement signal proportional to the applied torque. A unique feature in the operation of the present invention involves the method of measuring this displacement with an electrical transducer without introducing friction or hysteresis which may result in erroneous signal outputs when no torque is being applied. There are two basic design principles utilized to achieve this result:

(a) No bearings or friction producing elements are used, and
(b) The torsion tube displacement data is transmitted from one end of the torsion means 19 to the other without passing through any joint or other discontinuity through which the torque load is also transferred. This latter design principle is important since any joint made by means of screws, clamps or even a brazed joint will display a hysteresis characteristic far in excess of the hysteresis displayed by the torsion tube 20, if subjected to the torque load.

When the torsion tube 20 is displaced by application of a torque around the axis 21, the shaft 25 which may be press fitted into the flange 17 accurately transmits displacement of the flange 17 with respect to the flange 16 through the hollow center of the torsion tube 20 to the E pick-off armature support 26. Because of design principle (a), referred to above, the armature support 26 is supported radially by the limited rotation range flexural pivots 27 and 28 rather than by bearings. The flexural pivots, 27 and 28 maintain the air gap length stability required by the E pick-off 22. The armature support 26 is also statically balanced to prevent sensitivity to vibration. Design principle (b) is fulfilled by the use of a hollow torsion tube 20 made integral with the flanges 16 and 17 with a fixed center shaft 25 to transmit torsional displacement information from one end to the other. The design of a transducer with any other torsional spring element requires inclusion of at least one torque transmitting joint in the displacement measuring path. The small diameter center shaft 25 used for displacement data transmission lends itself ideally to the use of conventional commercially available flexural pivots such as 27 and 28.

When a torque in excess of the torsion tube range is applied, rotation of the housing 13 and, hence, the flange 16 is limited by contact between the sides of the openings 37 and 42 in the housing 13 and the stop members 40 and 41 are riveted to the flange 17. After contact is made with the stop members 40 and 41, no additional torque can be applied to the torsion section of the torsion tube 20 as the torque is then transmitted through the housing 13, the stop members 40 and 41, and the flange 17 directly to the control linkage 12.

Prior to contact of the stop members 40 and 41 with one of the sides of the openings 37 or 42 respectively, one of the switch arms 35 or 36 will abut against the housing 13 to close its associated switch and provide a mode control signal to the automatic flight control system 32.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A control stick transducer for use in automatic flight control systems for aircraft and connected between a control wheel and a control linkage, comprising
  (a) a housing connected to said control wheel,
  (b) an integral resilient torsion unit disposed within said housing and having first and second spaced flanges and a hollow torsion tube yieldingly connected therebetween for providing resilient restraint upon the application of a torque around a first axis coincident with the longitudinal axis of the torsion tube,
  (c) said first flange being secured to said housing,
  (d) said second flange being secured to said control linkage,
  (e) a rigid shaft coaxially disposed within said torsion tube with respect to said first axis and having one end connected to said second flange,
  (f) pick-off means having one portion mounted on said first flange and another cooperative portion mounted on said rigid shaft for providing a signal having an amplitude and phase representative of the magnitude and direction of the torque applied to said control wheel,
  (g) a support member, and
  (h) a pair of spaced flexural pivots pivotally mounting said support member on said first flange for providing limited relative movement therebetween around said first axis, said rigid shaft having its other end connected to said support member, and said another cooperative portion of said pick-off means being mounted on said support member.

2. A transducer of the character described in claim 1 further including switch means for providing a signal when a torque in excess of a predetermined torsion tube range is applied around said first axis.

3. A transducer of the character described in claim 1 further including stop means for providing a mechanical connection between said control wheel and said control stick when a torque in excess of a predetermined torsion tube range is applied around said first axis.

References Cited by the Examiner

UNITED STATES PATENTS

| | | | |
|---|---|---|---|
| 2,408,770 | 10/1946 | Frische et al. | 336—135 X |
| 2,564,484 | 8/1951 | Kuehni | 73—136 |
| 2,700,896 | 2/1955 | Root | 73—136 |

ROBERT K. SCHAEFER, *Primary Examiner.*

JOHN F. BURNS, *Examiner.*

D. JAMES BADER, *Assistant Examiner.*